(12) United States Patent
Best et al.

(10) Patent No.: US 7,980,589 B2
(45) Date of Patent: *Jul. 19, 2011

(54) INFLATABLE BOLSTER

(75) Inventors: Michael James Best, Newmarket (CA); Ray S. Roychoudhury, Bloomfield Hills, MI (US); Rimas Ciplijauskas, Etobicoke (CA)

(73) Assignee: Salflex Polymers Ltd., Winston, Ontraio (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/422,389

(22) Filed: Apr. 13, 2009

(65) Prior Publication Data

US 2009/0250915 A1    Oct. 8, 2009

Related U.S. Application Data

(63) Continuation-in-part of application No. 11/560,473, filed on Nov. 16, 2006.

(60) Provisional application No. 61/044,294, filed on Apr. 11, 2008, provisional application No. 60/738,222, filed on Nov. 17, 2005.

(51) Int. Cl.
*B60R 21/231* (2006.01)
*B60R 21/16* (2006.01)

(52) U.S. Cl. .............. 280/730.1; 280/732; 280/736; 280/752

(58) Field of Classification Search .............. 280/728.1, 280/730, 1, 730.2, 732, 751, 752, 736, 742
See application file for complete search history.

(56) References Cited

U.S. PATENT DOCUMENTS

| | | | |
|---|---|---|---|
| 2,834,606 | A | 5/1958 | Bertrand |
| 3,473,824 | A | 10/1969 | Carey et al. |
| 3,963,362 | A | 6/1976 | Hollis |
| 3,981,518 | A | 9/1976 | Pulling |
| 4,203,616 | A | 5/1980 | Okada |
| 4,297,051 | A | 10/1981 | Robinson |
| 4,362,425 | A | 12/1982 | Dixon |
| 4,511,281 | A | 4/1985 | Schmanski |
| 4,518,172 | A | 5/1985 | Bortz et al. |

(Continued)

FOREIGN PATENT DOCUMENTS

DE    19546143    6/1997

(Continued)

OTHER PUBLICATIONS

Anonymous "Inflatable Bellows-Box Panel" Research Disclosure, Mason Publications, Hampshire, Great Britain, vol. 374, No. 9 (Jun. 1, 1995).

(Continued)

*Primary Examiner* — Paul N. Dickson
*Assistant Examiner* — Barry Gooden, Jr.
(74) *Attorney, Agent, or Firm* — Michael Best & Friedrich LLP

(57) ABSTRACT

This invention is in the field of safety devices to lessen injuries arising from impact in vehicles, particularly automobiles. A bolster which may be employed to reduce impact severity to passengers from either frontal or side impacts is activated by impact sensing devices. The housing of the bolster has a lateral length L. Upon activation, the bolster is inflated with an activating fluid and extends the lateral length L of the bolster upon activation. A bolster is also provided having portions which inflate at differing rates.

11 Claims, 9 Drawing Sheets

U.S. PATENT DOCUMENTS

| | | | | |
|---|---|---|---|---|
| 4,597,691 | A | 7/1986 | Clarke | |
| 4,721,329 | A | 1/1988 | Brantman et al. | |
| 4,951,963 | A | 8/1990 | Behr et al. | |
| 5,082,310 | A | 1/1992 | Bauer | |
| 5,273,309 | A | 12/1993 | Lau et al. | |
| 5,324,070 | A | 6/1994 | Kitagawa et al. | |
| 5,370,417 | A | 12/1994 | Kelman et al. | |
| 5,382,051 | A * | 1/1995 | Glance | 280/751 |
| 5,456,490 | A | 10/1995 | Carter et al. | |
| 5,476,283 | A | 12/1995 | Elton | |
| 5,498,026 | A | 3/1996 | Eckhout | |
| 5,533,748 | A | 7/1996 | Wirt et al. | |
| 5,536,043 | A | 7/1996 | Lang et al. | |
| 5,556,128 | A | 9/1996 | Sinnhuber et al. | |
| 5,567,375 | A | 10/1996 | Filion et al. | |
| 5,716,093 | A | 2/1998 | Sadr | |
| 5,845,937 | A | 12/1998 | Smith | |
| 5,865,468 | A | 2/1999 | Hur | |
| D412,880 | S | 8/1999 | Sadr | |
| 5,931,493 | A | 8/1999 | Sutherland | |
| 5,957,493 | A * | 9/1999 | Larsen et al. | 280/743.1 |
| 5,967,594 | A * | 10/1999 | Ramanujam | 296/153 |
| 5,968,431 | A | 10/1999 | Ang et al. | |
| 6,032,978 | A | 3/2000 | Spencer et al. | |
| 6,158,766 | A * | 12/2000 | Kowalski | 280/730.1 |
| 6,203,057 | B1 * | 3/2001 | Spencer et al. | 280/730.1 |
| 6,213,497 | B1 * | 4/2001 | Spencer et al. | 280/730.1 |
| 6,250,665 | B1 | 6/2001 | Sutherland et al. | |
| 6,305,710 | B1 | 10/2001 | Bosgieter et al. | |
| 6,471,242 | B2 * | 10/2002 | Schneider | 280/732 |
| 6,517,103 | B1 | 2/2003 | Schneider | |
| 6,568,743 | B1 | 5/2003 | Jayasuriya et al. | |
| 6,578,867 | B2 * | 6/2003 | Khoudari et al. | 280/730.1 |
| 6,619,689 | B2 * | 9/2003 | Spencer et al. | 280/730.1 |
| 6,688,643 | B2 * | 2/2004 | Schneider | 280/753 |
| 6,712,385 | B2 * | 3/2004 | Enders | 280/730.1 |
| 6,758,493 | B2 | 7/2004 | Conlee et al. | |
| 6,817,625 | B2 | 11/2004 | Hjerpe | |
| 6,848,715 | B2 * | 2/2005 | Nelson et al. | 280/753 |
| 6,874,811 | B2 | 4/2005 | Enders et al. | |
| 6,971,667 | B2 * | 12/2005 | Enders et al. | 280/730.1 |
| 6,976,706 | B2 * | 12/2005 | Smith et al. | 280/753 |
| 6,991,252 | B2 * | 1/2006 | Enders | 280/728.1 |
| 7,021,652 | B2 | 4/2006 | Kumagai et al. | |
| 7,086,663 | B2 | 8/2006 | Honda | |
| 7,093,846 | B2 | 8/2006 | Reiter et al. | |
| 7,093,851 | B2 | 8/2006 | Lotspih | |
| 7,144,032 | B2 | 12/2006 | Lunt et al. | |
| 7,168,733 | B2 | 1/2007 | Kumagai et al. | |
| 7,213,840 | B2 * | 5/2007 | Kumagai | 280/752 |
| 7,350,852 | B2 * | 4/2008 | Rust et al. | 296/187.06 |
| 7,367,587 | B2 * | 5/2008 | Taoka | 280/751 |
| 7,393,013 | B2 | 7/2008 | Best et al. | |
| 7,396,040 | B2 * | 7/2008 | Enders et al. | 280/730.1 |
| 7,413,215 | B2 | 8/2008 | Weston et al. | |
| 7,422,234 | B2 | 9/2008 | Huber et al. | |
| 7,448,645 | B2 | 11/2008 | Bederka et al. | |
| 7,481,457 | B2 | 1/2009 | Best et al. | |
| 7,568,722 | B2 | 8/2009 | Sato et al. | |
| 7,578,518 | B2 | 8/2009 | Ochiai et al. | |
| 2001/0054811 | A1 * | 12/2001 | Spencer et al. | 280/730.1 |
| 2003/0197354 | A1 * | 10/2003 | Beland et al. | 280/730.1 |
| 2004/0007856 | A1 * | 1/2004 | Enders et al. | 280/730.1 |
| 2004/0075252 | A1 | 4/2004 | Pan | |
| 2004/0100075 | A1 | 5/2004 | Sakai et al. | |
| 2004/0135353 | A1 * | 7/2004 | Enders et al. | 280/730.1 |
| 2004/0145163 | A1 * | 7/2004 | Galmiche et al. | 280/730.1 |
| 2004/0155447 | A1 * | 8/2004 | Smith et al. | 280/753 |
| 2004/0163872 | A1 | 8/2004 | Lincoln et al. | |
| 2004/0163873 | A1 | 8/2004 | Polz et al. | |
| 2004/0178616 | A1 | 9/2004 | Yoshikawa | |
| 2004/0232666 | A1 | 11/2004 | Sato et al. | |
| 2005/0023802 | A1 * | 2/2005 | Enders et al. | 280/728.2 |
| 2005/0029781 | A1 | 2/2005 | Enders et al. | |
| 2005/0052005 | A1 | 3/2005 | Lunt et al. | |
| 2005/0052010 | A1 * | 3/2005 | Best et al. | 280/751 |
| 2005/0052011 | A1 * | 3/2005 | Best et al. | 280/752 |
| 2005/0057024 | A1 | 3/2005 | Weston et al. | |
| 2005/0098996 | A1 * | 5/2005 | Enders | 280/751 |
| 2005/0253369 | A1 * | 11/2005 | Taoka | 280/752 |
| 2006/0214400 | A1 * | 9/2006 | Enders et al. | 280/730.1 |
| 2007/0052219 | A1 | 3/2007 | Rust et al. | |
| 2007/0108746 | A1 | 5/2007 | Ochiai et al. | |
| 2007/0108747 | A1 * | 5/2007 | Roychoudhury et al. | 280/732 |
| 2007/0152431 | A1 * | 7/2007 | Rust et al. | 280/730.2 |
| 2007/0296187 | A1 | 12/2007 | Ochiai | |
| 2008/0061537 | A1 * | 3/2008 | Enders | 280/730.1 |
| 2009/0152848 | A1 * | 6/2009 | Sadr et al. | 280/730.2 |
| 2009/0152849 | A1 * | 6/2009 | Saraf et al. | 280/730.2 |
| 2009/0250915 | A1 | 10/2009 | Best et al. | |

FOREIGN PATENT DOCUMENTS

| | | |
|---|---|---|
| DE | 19858520 | 4/2000 |
| DE | 10123207 | 7/2002 |
| EP | 0274535 | 7/1988 |
| EP | 1426249 | 6/2004 |
| EP | 1663725 | 12/2009 |
| GB | 2272670 | 5/1994 |
| JP | 63-002741 | 1/1988 |
| JP | 06-037011 | 5/1994 |
| JP | 11-091454 | 4/1999 |
| JP | 2000-326810 | 11/2000 |
| JP | 2002-522286 | 7/2002 |
| JP | 2004-338677 | 12/2004 |
| JP | 2007-504050 | 3/2007 |
| WO | 00/07851 | 2/2000 |
| WO | 00/50270 | 8/2000 |
| WO | 2004/071818 | 8/2004 |
| WO | 2006/132990 | 12/2006 |
| WO | 2007/056849 | 5/2007 |
| WO | 2009/124394 | 10/2009 |
| WO | 2009/124395 | 10/2009 |
| WO | 2009/124401 | 10/2009 |

OTHER PUBLICATIONS

International Search Report, International Patent Application No. PCT/CA2006/001862, mailed Feb. 1, 2007.

Written Opinion of the International Search Authority, International Patent Application No. PCT/CA2006/001862, mailed Feb. 1, 2007.

Supplementary European Search Report, European Patent Application No. EP 06 80 4728.1, dated Jun. 15, 2009.

European Examination Report, European Patent Application No. EP 06 80 4728.1, dated Oct. 27, 2009.

Response to European Examination Report, European Patent Application No. EP 06 80 4728.1, dated Mar. 3, 2010.

Communication under Rule 71(3) EPC Intention of Grant, European Examination Report, European Patent Application No. EP 06 80 4728.1, dated Jun. 14, 2010.

Canadian Patent Application No. 2,535,661 Notice of Allowance dated Feb. 1, 2010.

Canadian Patent Application No. 2,535,661 Office Action dated Jan. 20, 2009.

European Patent Application No. 04761769.1 Examination Report dated Mar. 23, 2007.

European Patent Application No. 04761769.1 Communication under Rule 71(3) EPC dated Jul. 1, 2009.

European Patent Application No. 04761769.1 Decision to Grant dated Nov. 19, 2009.

European Patent Application No. 04761769.1 Supplementary European Search Report dated Nov. 1, 2006.

European Patent Application No. 06771989.8 Supplementary European Search Report dated Feb. 8, 2010.

European Patent Application No. 06771989.8 Examination Report dated May 21, 2010.

International Patent Application No. PCT/CA2004/001605 International Search Report dated Feb. 8, 2005.

International Patent Application No. PCT/CA2006/001862 International Preliminary Report on Patentability dated May 29, 2008.

International Patent Application No. PCT/CA2006/001862 International Search Report and Written Opinion dated Feb. 1, 2007.

International Patent Application No. PCT/CA2009/000475 International Search Report dated Jul. 7, 2009.
International Patent Application No. PCT/CA2009/000476 International Search Report and Written Opinion dated Jul. 28, 2009.
International Patent Application No. PCT/CA2009/000507 International Search Report dated Jul. 14, 2009.
International Patent Application No. PCT/US2006/021507 International Search Report and Written Opinion dated Oct. 26, 2006.
International Patent Application No. PCT/US2006/021507 International Preliminary Report on Patentability dated Dec. 6, 2007.
Japanese Patent Application No. 2006-525586 Office Action dated Apr. 6, 2010.
U.S. Appl. No. 11/915,797 Office Action dated Apr. 14, 2010.
U.S. Appl. No. 11/915,797 Office Action dated Feb. 18, 2010.

* cited by examiner

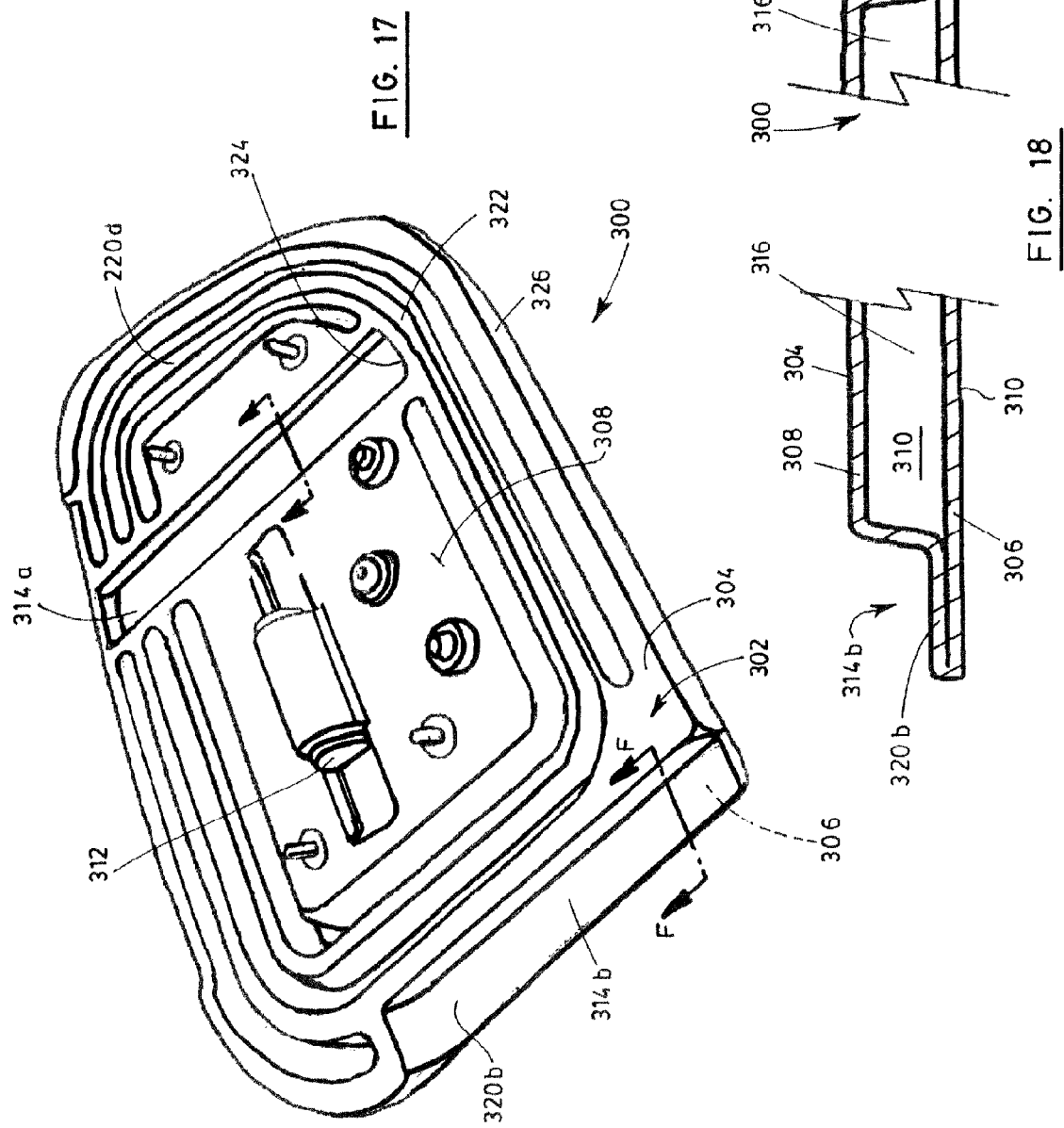

INFLATABLE BOLSTER

CROSS-REFERENCE TO RELATED APPLICATIONS

This application is a continuation-in-part of U.S. patent application Ser. No. 11/560,473, filed Nov. 16, 2006 which claims the benefit of U.S. Provisional Patent Application No. 60/738,222, filed Nov. 17, 2005. The application additionally claims the benefit of U.S. Provisional Patent Application No. 61/044,294, filed Apr. 11, 2008. All references are incorporated by reference in their entirety.

FIELD OF THE INVENTION

This invention relates to the field of safety devices as are often installed in motor vehicles, particularly automobiles. Amongst many safety devices that are installed in vehicles to lessen injuries arising from impact are bolsters. A bolster may be part of an instrument panel in which case the bolster extends transversely to the vehicle. Bolsters may also be used for side impact events in which case the length of a bolster may extend longitudinally of the vehicle. Such bolsters may be mounted in door panels, side panels or roof panels of the vehicle. Bolsters can also be utilized in other locations and directions as desired to lessen injuries arising from impact events.

BACKGROUND OF THE INVENTION

In the first instance, bolsters are designed with a design point of impact. The design point of impact is determined by assuming the position of a statistical male or female occupant. Ideally, the vehicle occupant is in a designated position and is using a seatbelt or other similar safety harness. However, because of the differentiation in size of the vehicle occupants and because not all vehicle occupants use seatbelts, and therefore the location of the occupant may not be as expected, the point of impact between the occupant and the bolster may occur at other than the most desirable design location. Vehicles also have many other envelope constraints as to the amount of space available for mounting a bolster. In many cases, the vehicle mounting envelope constraints confine a bolster to a certain lateral length. It would be desirable, however, that the bolster, when called upon to provide its safety function, have a greater lateral length.

As used in this description and claims, the term "lateral" is used to describe the transverse width of the bolster. If the bolster were mounted against an instrument panel, the lateral extent of the direction would be transverse of the vehicle. If the bolster were mounted to a door frame, the lateral extent of the bolster would extend longitudinally of the vehicle. If the bolster were mounted on an angular support pillar such as an A pillar, the lateral length of the bolster would extend longitudinally and angularly of the vehicle. In short, the term "lateral" is intended to encompass any mounting location of the bolster with regard to the vehicle.

In accordance with the information set out above, it would be desirable, if a bolster were able to increase its lateral extent upon activation.

Known in the art are the following patent and patent applications which disclose inflatable bolsters and the like: US 2007/0108747; U.S. Pat. No. 6,032,978; U.S. Pat. No. 6,203,057; U.S. Pat. No. 6,305,710; U.S. Pat. No. 6,517,103; U.S. Pat. No. 6,578,867; U.S. Pat. No. 6,619,689; U.S. Pat. No. 6,758,493; U.S. Pat. No. 6,848,715; U.S. Pat. No. 6,976,706; U.S. Pat. No. 7,350,852; and WO 2006/132990.

SUMMARY OF THE INVENTION

In accordance with this invention, an inflatable bolster includes a housing, the housing defines a substantially closed volume for receiving fluid under pressure. The bolster has a source of pressurizing fluid. The housing defines an occupant face and a mounting face. The housing has a lateral length L in the direction substantially parallel to the occupant face. The bolster comprises an extension structure for extending the lateral length L of the bolster upon pressurization of the bolster.

In accordance with another aspect of the present invention, an inflatable bolster for use in an occupant compartment of a vehicle is provided, the inflatable bolster comprising a inflatable housing having a mounting wall which is devised to mount to a reaction structure of the vehicle, an occupant wall which is opposite the mounting wall and devised to face the occupant compartment, a substantially closed volume formed between the mounting wall and the occupant wall, and a restriction means formed between the mounting wall and the occupant wall for restricting fluid flow between different areas of the housing. The inflatable bolster also comprises a source of pressurized fluid mounted to the housing and being in fluid communication with the substantially closed volume for inflating the housing.

BRIEF DESCRIPTION OF THE DRAWINGS

The invention will be better understood, upon review of the attached drawings which illustrate various embodiments in accordance with the invention.

FIG. 17 illustrates a perspective view of a bolster in accordance with the invention which incorporates a fifth embodiment of the invention;

FIG. 18 is a sectional view taken along lines EE and FF shown in FIG. 17;

DETAILED DESCRIPTION OF THE INVENTION

Bolsters may be used to provide energy absorption to lessen injury in the event of a vehicle/occupant impact. A bolster achieves the energy absorption by filling the bolster with a pressurized fluid, usually a gas, upon the occurrence of an impact event. Once the bolster is filled with fluid, then energy is absorbed by releasing the fluid through an orifice of controlled size.

Some bolsters are described as active bolsters. An active bolster differs from an inactive bolster in that the bolster moves relative to its support surface towards the occupant. By decreasing the distance between the occupant face of the bolster and the occupant, then a greater length of time may be used to slow the speed of the occupant relevant to the speed of the vehicle and thus provide an opportunity for reduction of force in decelerating the occupant relative to the vehicle. The invention of the present application may be utilized with either active or inactive bolsters.

Typically bolsters are pressurized by a source of gas which may be contained in a cartridge. The gas may be released by initiators which may be linked to various vehicle sensors. The vehicle sensors may sense a vehicle impact which may be in the nature of an excessive deceleration, as may be typical in frontal impacts of moving vehicles, a rapid vehicle acceleration as may be involved in a rear impact, vehicle lateral acceleration as may be involved in impacts from either side of the vehicle or impending vehicle rollover. In all cases, when such a vehicle event occurs, there develops a relative velocity between the vehicle and the occupants riding in the vehicle. The occupants may then strike vehicle structure and the purpose of the bolster is to reduce the forces involved so as to lessen injury.

Figure 1:
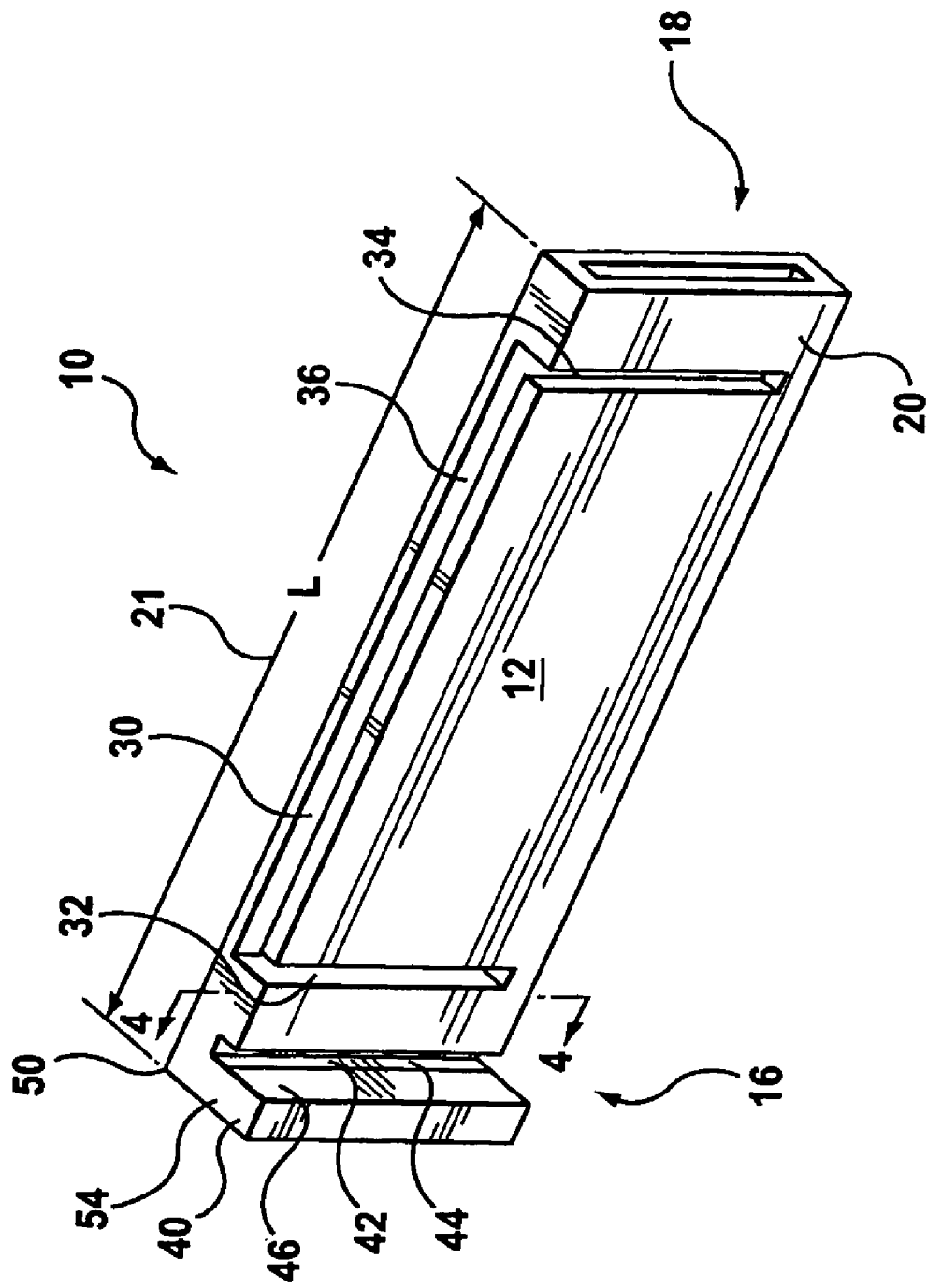
FIG. 1 illustrates an isometric view of a bolster in accordance with the invention which incorporates alternate first and second embodiments of the invention.
Figure 3:
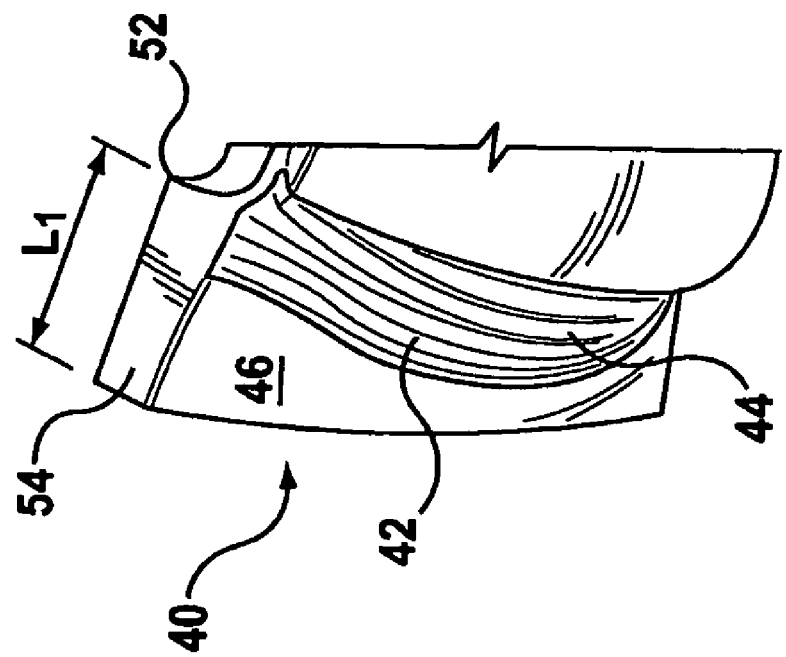
FIG. 3 illustrates an isometric view of the deployed configuration of the structure illustrated in FIG. 2.
Figure 2:
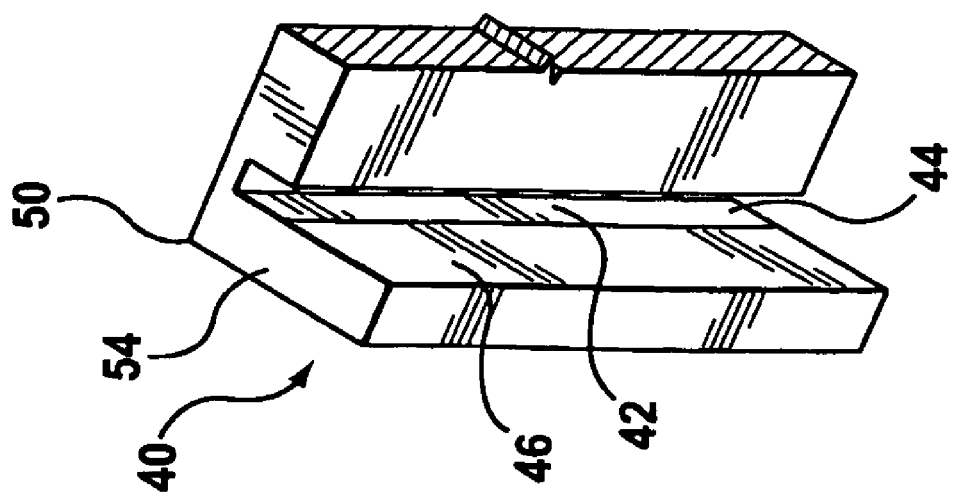
FIG. 2 illustrates an isometric view of the un-deployed configuration of the left end of the bolster of FIG. 1.

FIG. 1 illustrates a bolster generally at 10. The bolster has a mounting face 12 and an occupant face 14, visible in FIG. 4. The bolster 10 includes an extension structure 16 located at the left hand end of bolster 10 and extension structure 18 located at the right hand end of bolster 10. While bolster 10 has been illustrated as embodying the two extension structures 16 and 18 respectively, it will be recognized that in accordance with this invention, a bolster may use any combination of one or more of extension structures 16 and 18. Thus, a bolster may utilize one such extension structure 16 or two or more extension structures 16. Similarly, a bolster may involve one extension structure 18 or two or more extension structures 18. A bolster may have any combination of one or more of the two extension structures.

In accordance with this embodiment of this invention as illustrated in FIG. 1, the bolster is a unitary structure. Being a unitary structure, the bolster is preferably made by a blow molding procedure. The bolster includes a housing 20. The housing defines the occupant face 14 and the mounting face 12. The housing defines a substantially closed volume 22. The volume 22 is described as substantially closed in that the volume is intended to confine the pressurizing gas when the bolster is activated. The housing will thus either define an inlet for pressurized gas or pressurized gas will be stored in a preactivation cylinder within the housing. The housing will also define one or more exhaust apertures to permit release of gas during the energy absorption phase.

As shown in the un-deployed stage, the housing defines a lateral length L extending in the direction which is substantially parallel to the occupant face.

It will be understood that upon activation, fluid will fill the closed volume of the bolster. In the embodiment illustrated in FIG. 1, the bolster also includes expansion facilitating structure 30. This allows the bolster to be an active bolster so that the occupant face will move toward the occupant to assist in reduction of forces experienced by the occupant on contacting the bolster. In the particular example illustrated in FIG. 1, the expansion facilitating structure 30 comprises two vertically extending pleats 32 and 34 and a laterally extending pleat 36. The effect of these pleats during deployment will be discussed below.

Figure 6:
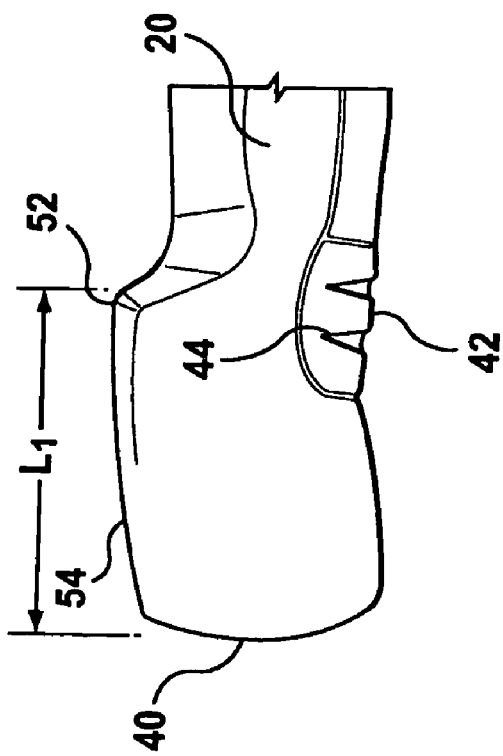
FIG. 6 is a plan view of the deployed bolster of FIG. 5.
Figure 4:
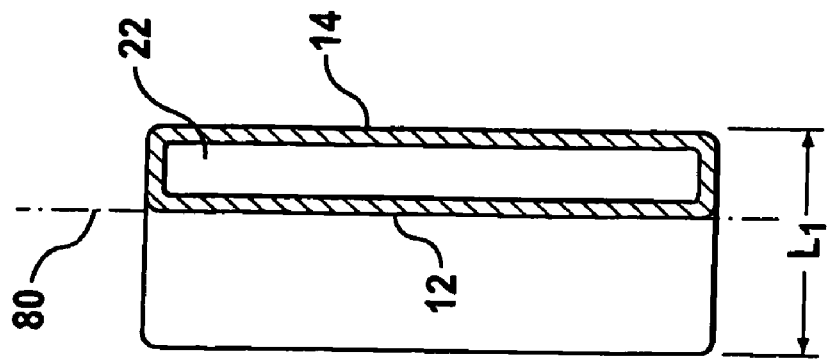
FIG. 4 illustrates a cross-section of the bolster of FIG. 1 taken along line 4-4.

Focusing now on the left hand end of the structure, in FIG. 1, the housing 20 includes a main portion 21 and an auxiliary portion 40. The extension structure 16 comprises in part the auxiliary portion 40. The auxiliary portion 40 is an integral part of the housing 20 and is also a hollow structure. The auxiliary portion 40, extends away from the occupant face 14 in a direction which is substantially perpendicular to the dimension L. The auxiliary portion 40 has a length $L_1$ as illustrated in FIG. 4. Upon deployment of the bolster, the auxiliary portion 40 moves hingedly relative to the main portion 21 to extend the lateral length L of the bolster 10 by an amount substantially equal to $L_1$ thereby providing a laterally enlarged bolster for use during the deployment phase. The extension structure 16 also includes an expandable area 42. The expandable area 42, preferably includes at least one pleat 44. The expandable area 42 is formed at the intersection of the mounting face 12 and an inner face 46 of the auxiliary portion 40. Expansion of the expandable area 42 and the pressurization of the auxiliary portion 40 in conjunction with pressurization of the main portion causes the auxiliary portion 40 to move hingedly to the deployed position as shown in FIG. 6. As the auxiliary portion 40 moves hingedly relative to the main portion 21, the corner 50 where the auxiliary portion 40 meets with the occupant face of the main portion 21, distortion will occur, although the apex may remain as is shown diagrammatically at 52 in FIG. 6. In addition, the uppermost surface 54 of the auxiliary portion 40 may also deform upwardly under the effect of the pressurizing fluid.

Figure 8:
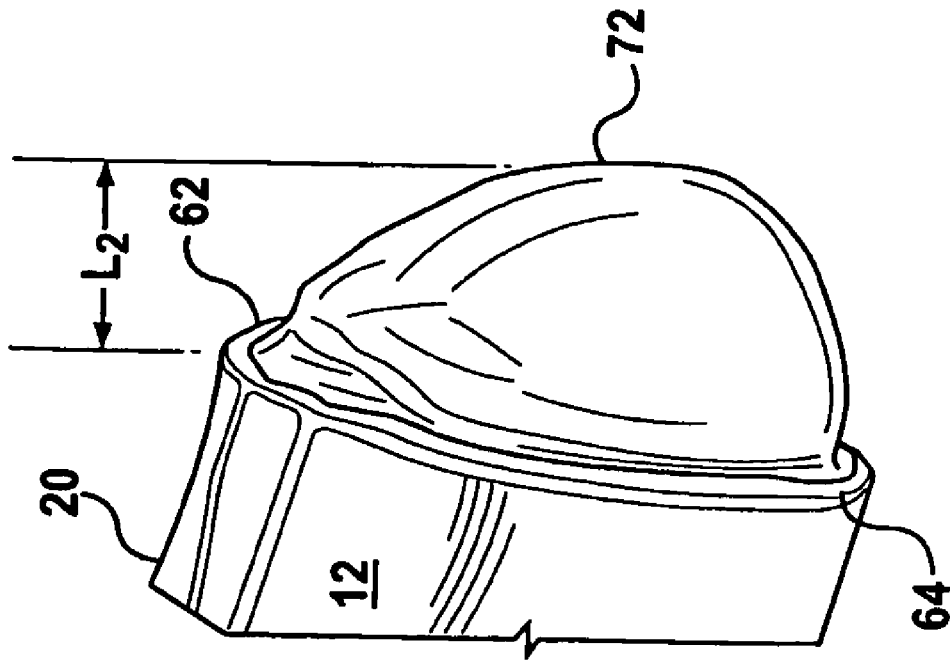
FIG. 8 illustrates in perspective view the structure of FIG. 7 in the deployed configuration.
Figure 7:
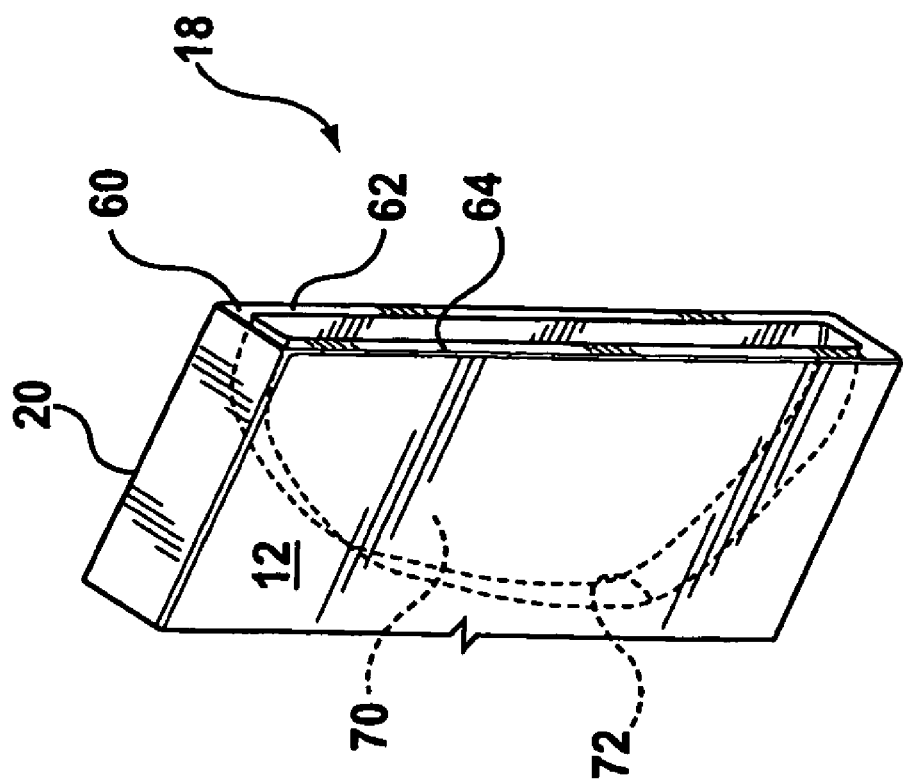
FIG. 7 is a perspective view of the structure of the right-hand end of the bolster of FIG. 1 in the un-deployed configuration.

Focusing now on the right hand end of the bolster 10 as illustrated in FIG. 1, reference is made to FIGS. 7 and 8. The extension structure 18 in this embodiment, is illustrated in an end face 60 of the housing 20. The end face 60 includes an end face wall 62 which comprises the occupant face 14 of the bolster 10. Additionally, the end face 60 includes a mounting wall face 64, which coincides with the mounting face 12. In the embodiment illustrated, the extension structure 18 includes an expandable area 70. The expandable area advantageously includes at least one first pleat 72.

As shown in FIG. 7, the expandable area 70 is in the form of at least one pleat 72 which extends internally into the closed volume 22 of the bolster 10. Upon activation of the bolster, the pressurized fluid, pushes the pleat 72 out, relative to the end face 60, where the pleat is able to expand to the position shown in FIG. 8. The pleat 72, having extended externally of the housing 20 now provides an additional length $L_2$ to the bolster for use in energy absorption on contact with a vehicle occupant (see FIG. 8).

Preferably, the bolster 10 is made in a blow molding operation. In blow molding, a parison is extruded, the parison is enclosed in a blow mold structure, and a blowing gas is injected into the interior of the parison. Upon expansion of the parison, the parison then expands so as to obtain the shape of the mold cavity. Generally speaking, the wall thickness of the parison is relatively uniform throughout the expanded parison subject to the necessity of plastic flow to obtain the shape as defined by the mold. In the blow molding process, slides can be established in the mold. The term "slide" is used to describe a structure that is used to move from a withdrawn position (usually not in the mold cavity) to an extended position, before the parison has cooled. By extending the slide, which effectively moves the slide against the wall of the parison, the wall of the parison is stretched to move inwardly of the mold surface. Thus, use of a slide may be used to create the at least one pleat 72 in connection with the extension structure 18 and to locate that structure so that it extends internally of the housing 20. The use of the slide does not, however, rupture the wall of the parison. Thus the finished product can still remain as a housing defining a substantially closed volume. Use of the slide, will create a diminution of the thickness of the wall of the parison, this helps to create a relatively thinner wall, which is then capable of undergoing the movement between the un-deployed and deployed configurations illustrated in FIGS. 7 and 8 without rupture of the wall of the housing. To facilitate movement of this type, the plastic used for the parison may be selected from the group of suitable materials including by way of example thermoplastic olefins or a plastic available from Salflex Polymers under the trade mark SALFLEX 245™.

Similarly, the extension structure 16 illustrated in FIGS. 1 through 4 may be formed by the use of slides in a blow mold. The auxiliary portion 40 can be readily formed in the blow mold. The expandable area 42 and the at least one pleat 44 can be created in the blow mold by use of a slide which moves some of the parison wall internally of the mold cavity to create the structure upon cooling, as shown at the left hand end of FIG. 1. This process also is capable thus of creating an expandable area while ensuring that the housing still remains with a substantially closed volume.

As shown in FIG. 1, the bolster 10 is what is referred to as an active bolster. Thus, rather than simply pressurizing the bolster and using the pressurized thickness of the bolster for energy absorption, it is desirable that the occupant face extend outwardly toward the occupant. The pressurization of the bolster may itself distort the bolster so that the bolster achieves a more rounded configuration than the un-deployed, substantially rectangular configuration illustrated in the embodiment shown in FIG. 1. However, in order to facilitate further movement of the occupant face relevant to the mounting face, the bolster 10 may also include the expansion structure 30. The expansion structure 30 can include second pleats to facilitate such expansion. The pleats may be made by use of slides or by initial configuration of the mold depending upon the location of the mold parting lines and the configuration of the mold cavity. Most preferably as shown in FIG. 1, the expansion structure, includes the generally vertically extending pleats 32 and 34 as well as the longitudinally extending pleat 36. By providing at least one pleat and preferably a series of pleats, the bolster may deform outwardly relative to the mounting face 12.

Figure 5:
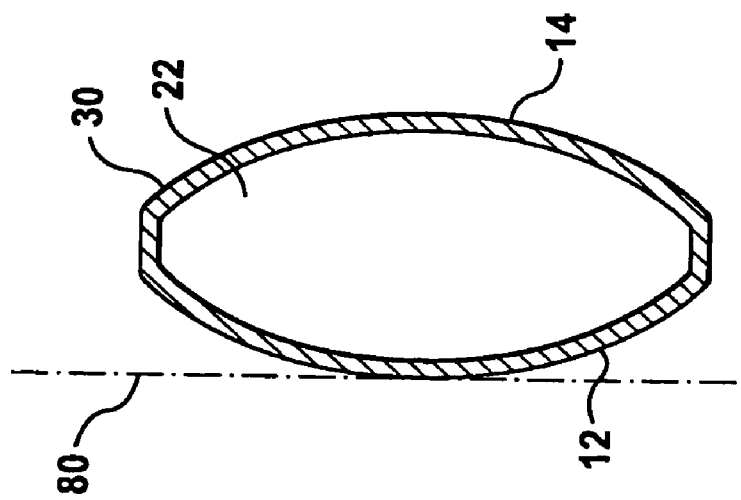
FIG. 5 is a similar cross-section to FIG. 4 showing the bolster of FIG. 4 in deployed configuration.

As shown in FIG. 4, the mounting face 12 will be mounted against a suitable support or reaction structure illustrated generally by the dotted line 80. As shown in FIG. 5, it is assumed there is no relative movement of the reaction surface 80. Thus, deformation of the expandable structure 30, as well as general deflection of the wall of the housing, means that the housing 20 will form a substantially sausage shape. As well, the general deflection of the wall of the housing, means that the housing 20 will form a substantially sausage shape as shown in FIG. 5. As shown, the occupant face 14 is no longer necessarily planar but is moved effectively closer to the occupant. This provides a greater distance for energy absorption before the occupant comes into contact with the mounting surface 80. As shown in FIG. 6, the auxiliary portion 40 has hingedly moved relative to the main portion by expansion of the expandable area 42 through expansion of the at least one pleat 44.

Figure 9:
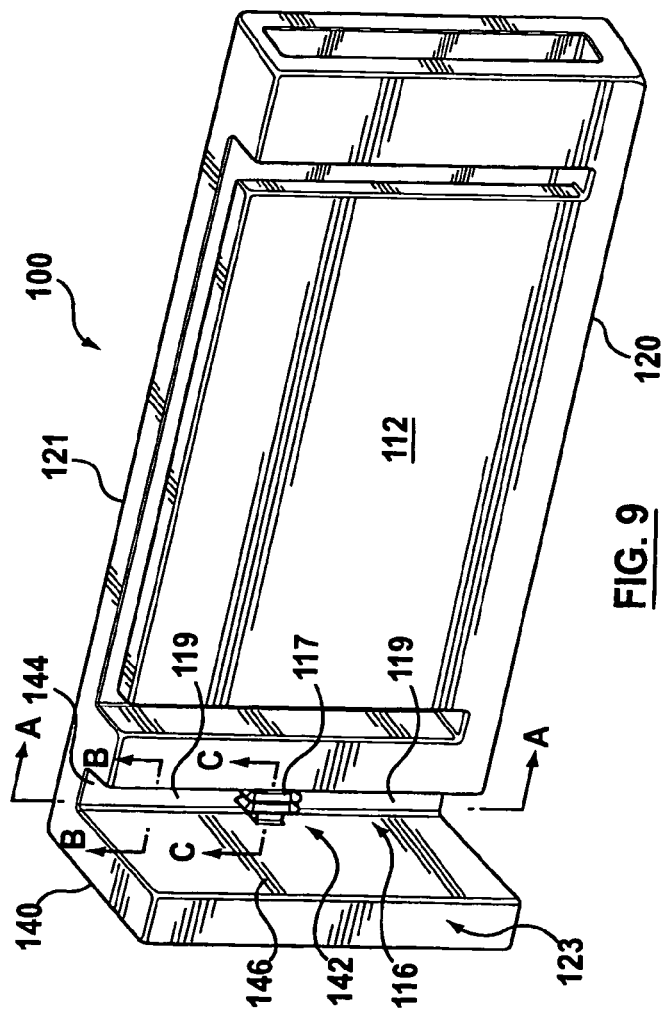
FIG. 9 illustrates a perspective view of a bolster in accordance with the invention which incorporates a third embodiment of the invention.
Figure 10:
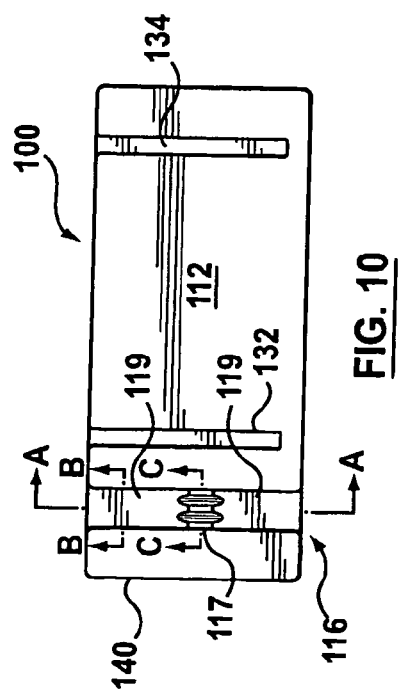
FIG. 10 is a front view of the bolster shown in FIG. 9.

FIG. 9 illustrates, in perspective, an alternative embodiment of the invention. In FIG. 9, the bolster shown generally at 100 includes a mounting face 112 and an occupant face 114. The bolster 100 is an active bolster and includes an extension structure 116 located at the left hand end of bolster 100 as illustrated in FIG. 9. The bolster 100 includes a housing 120. The housing 120 defines a substantially closed chamber 122. In many respects the bolster 100 is similar to the bolster 10 illustrated in FIG. 1.

The bolster 100 includes a main portion 121 and an auxiliary portion 140. The extension structure 116 comprises in part the auxiliary portion 140. The auxiliary portion 140 is an integral part of the housing 120 and is also a hollow structure. The auxiliary portion 140 includes an auxiliary chamber 123.

The extension structure 116 also includes an expandable area 142. The expandable area 142 preferably includes at least one pleat 144. In this respect, the embodiment illustrated in FIG. 9 operates similar to the embodiment illustrated in FIG. 1.

Figure 11:
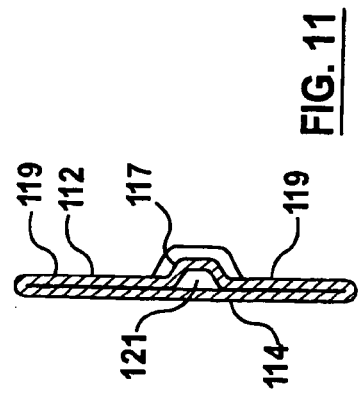
FIG. 11 is a sectional view taken along line AA as shown in FIGS. 9 and 10.
Figure 12:
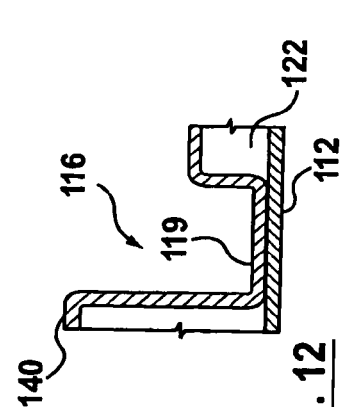
FIG. 12 is a sectional view taken along lines BB shown in FIGS. 9 and 10.
Figure 13:
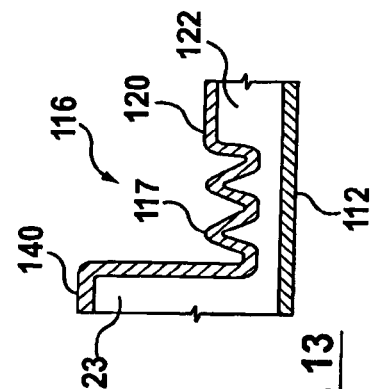
FIG. 13 is a sectional view along line CC illustrated in FIGS. 9 and 10.

The principal difference between these two embodiments however is the ability to change the rate at which the activating fluid flows into the auxiliary chamber 123. The source of inflating fluid to cause activation of the bolster is first directed to the chamber 122 in main portion 120. To control the rate of flow of activating fluid from the main portion to the auxiliary portion, a restriction means including a limited flow path is provided. In this example, the expansion structure 116 includes a hollow ribs 117. The rib 117 is defined by slides which may be activated during the blow molding manufacturing process by setting out depressed areas 119 on either side of the rib. As shown in FIGS. 11, 12 and 13, the hollow rib 117 is formed by slides which move the mounting face 112 against the interior of the occupant face 114. This provides a channel 121 for flow of fluid from the chamber 122 within the main portion 120 to the auxiliary chamber 123 within the auxiliary portion 140. Also, as shown in this embodiment the rib 117 is itself in the form of a bellows so as to not restrict the desired movement of auxiliary portion 140 relative to main portion 121. By selection of the number of ribs 117 and the sizing of those ribs, the inflation characteristics of the auxiliary portion 140, can be controlled by the designer.

It is preferred that in operation, particularly with respect to an active bolster, that the main portion of the bolster first begin to modify its position relative to the vehicle occupant before movement of the auxiliary portion 140 to the deployed position. By providing a relatively restrictive flow path using at least one such rib 117, the deployment timing of the auxiliary portion 140 can be selected as desired. Any number of ribs 117 having any particular size of flow channel or configuration may be utilized. By using at least one such rib, it is possible to obtain what is, in effect, a slightly delayed deployment of the auxiliary portion 140 relative to the time that the main portion 121 begins its deployment upon activation.

Figure 14:
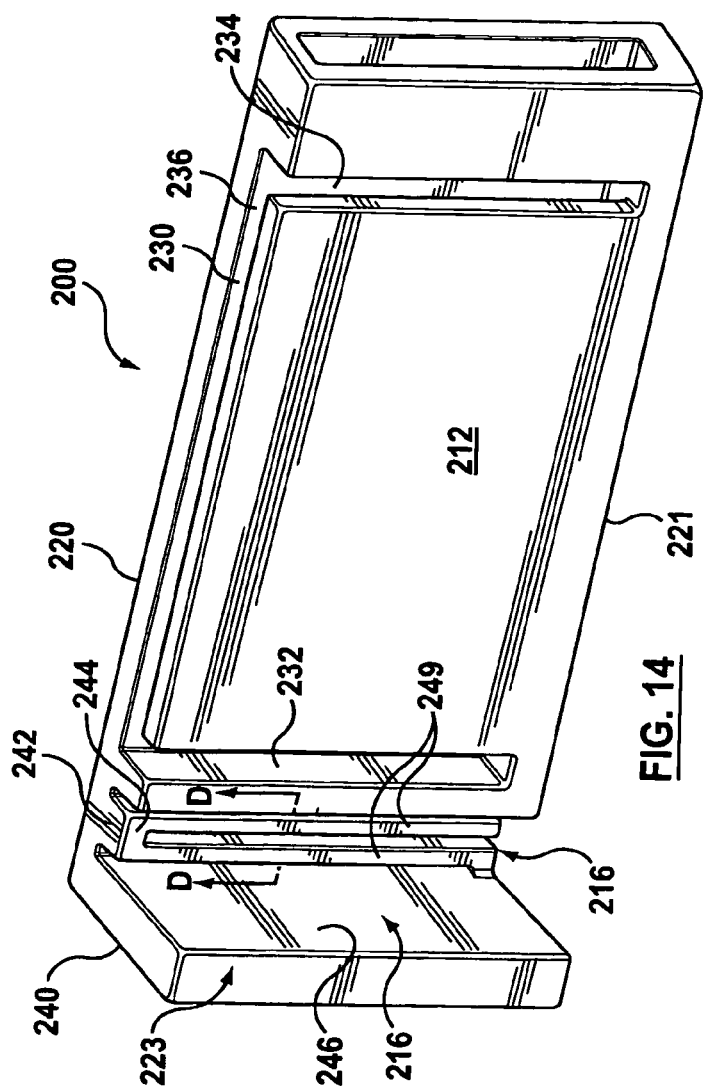
FIG. 14 illustrates an isometric view of a bolster in accordance with the invention which incorporates a fourth embodiment of the invention.

FIG. 14 illustrates a further embodiment and illustrates a bolster 200. The bolster 200 is similar to the bolster 100 except that the extension structure 216 is provided to activate the movement of the auxiliary portion 240 relevant to the main portion 220. In this case, the extension structure 216 includes an expandable area 242 which includes at least one pleat 244. In this case the pleat 244 has a central depressed portion 245, together with two grooves 247 which define the pleat 244.

Figure 16:
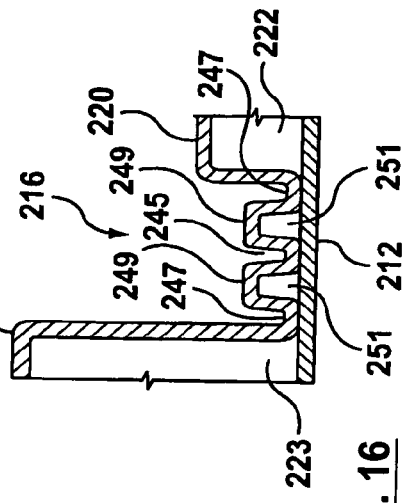
FIG. 16 is a sectional view along line DD of FIGS. 14 and 15.
Figure 15:
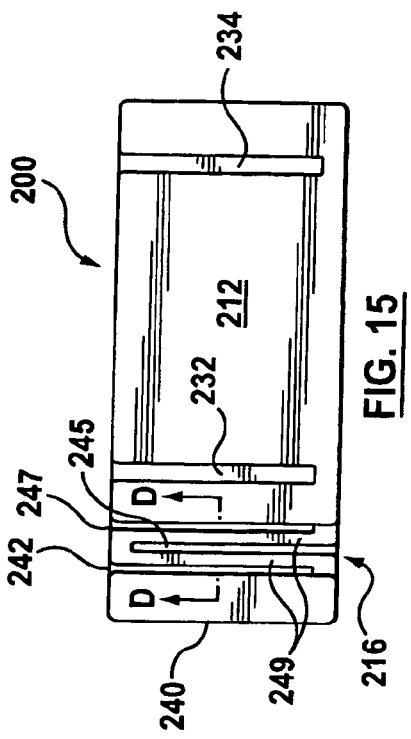
FIG. 15 is a front view of the bolster of FIG. 14.

As shown in FIG. 16, the depressed areas 247 and 245 constitute therebetween, a pair of ribs 249 which extend vertically upwardly, as shown in FIG. 14. This in turn defines a pair of conduits 249, each conduit having internally thereof a flow path 251. Because the depressed areas 247 do not extend all the way to the lower edge of the pleat 244 as shown in FIGS. 14 and 15, there is a flow path for activating fluid, firstly from the main portion 220 to the first rib 249, vertically upwardly through the first flow path 251 and then horizontally across the upper edge, as illustrated in FIGS. 14, and 15 and then downwardly through the second flow path 251 where it may then enter into the auxiliary portion 240. Thus, the pleat 244 provides a serpentine path flow. This serpentine path flow by its length and cross-sectional size constitutes a restriction means which can also be used to provide a somewhat restricted flow and thus a slightly delayed deployment of the auxiliary portion 240 upon application of activating fluid to the main portion 220.

Either of the bolsters 100 or 200 illustrated in FIGS. 9 through 13 and 14 through 16 respectively, may be fitted with similar structures on the right hand end as depicted, or structures similar to structure 18 as discussed in association with the bolster of FIG. 1. It will also be possible to vary the number and location of the various flow channels to achieve the desired activation time delay as may be considered desirable.

FIG. 17 illustrates, in perspective, an alternative embodiment of the invention. In FIG. 17, the bolster shown generally at 300 comprises a housing 302 which includes a mounting wall 304 and an occupant wall 306 which is opposite thereto. The mounting wall 304 comprises an exterior mounting face 308 which, when installed, faces the reaction structure of the vehicle. The occupant wall 306 comprises an exterior occupant face 310 which, when installed, faces the vehicle interior and any occupants therein.

As shown in FIG. 18, a substantially closed volume 310 is formed between the mounting wall 304 and the occupant wall 306. The bolster 300 further comprises a source of pressurized fluid 312 which is mounted to the housing 302 and, as discussed above, serves to inflate the bolster 300 by injecting pressurized fluid into the volume 310, In the illustrated embodiment, this source 312 is a cartridge.

The housing 302 comprises a first and a second restriction means 314a and 314b formed between the mounting wall 304 and the occupant wall 306 for restricting the flow of the fluid injected by the source 312. The restriction means 314a and 314b restricts the fluid flow between different areas 316, 320a and 320b of the housing 302.

Similar to the hollow rib 117 of FIGS. 9 to 13 and the pleat 244 of FIGS. 14 to 16, the restriction means 314a and 314b separate the housing 302 into a main chamber 316 into which the source 312 injects pressurized fluid and respective auxiliary portions 320a and 320b.

In the embodiments illustrated, the restriction means 314a and 314b both comprise depressed areas 314a and 314b, similar to the depressed area 119 of FIGS. 9 to 13 and the depressed areas 245 and 247 of FIGS. 14 to 16. These areas 314a and 314b are preferably formed during molding of the housing 302 and formed by compressing the mounting wall 304 until it meets the occupant wall 306 such that once molded the two walls 304 and 306 are in contact. It will be appreciated however that the occupant wall 306 could similarly be compressed into the mounting wall 304. The depressed areas 314a and 314b are sealingly bonded together in order to prevent air from seeping through.

In the embodiment illustrated, the depressed area 314a does not extend the entire width of the housing. The depressed area 314a comprises a channel 322 at the end 324 which connects the main chamber 316 with the interior of the auxiliary portion 320a, which here forms a hollow auxiliary chamber 318a. During deployment of the bolster 300, fluid flows from the source 312, into the main chamber 316, through the channel 322 and into the auxiliary chamber 318a.

As before, by forcing the pressurized fluid through the channel 322, the rate at which the fluid enters the auxiliary chamber 318a, and hence the rate of inflation of the auxiliary chamber 318a, will differ from that of the main chamber 316. In particular, choking the fluid flow at the channel 322 can enable a slightly delayed deployment of the auxiliary portion 320a. By varying the diameter and shape of the channel 322, the relative rates of inflation of the main and auxiliary chambers 316 and 318a can be adjusted.

It will be appreciated that, in contrast with the auxiliary portions of the previous figures, the auxiliary portions 320a and 320b are not provided with an extension structure.

In the embodiment illustrated, auxiliary portion 320b consists of the depressed area 314b. In other words, the portions of the mounting wall 304 and the occupant wall 306 which form the auxiliary portion 320b have been compressed and no fluid can travel in or out thereof. As such, the auxiliary portion 320b will not inflate. It will be appreciated that such a non-inflating portion of the bolster 300, whose occupant face 310 may be subject to various additional esthetic and/or packaging constraints, advantageously enables a variety of design options which might not be available given a conventional bolster whose entire housing was inflated.

Figure 19:
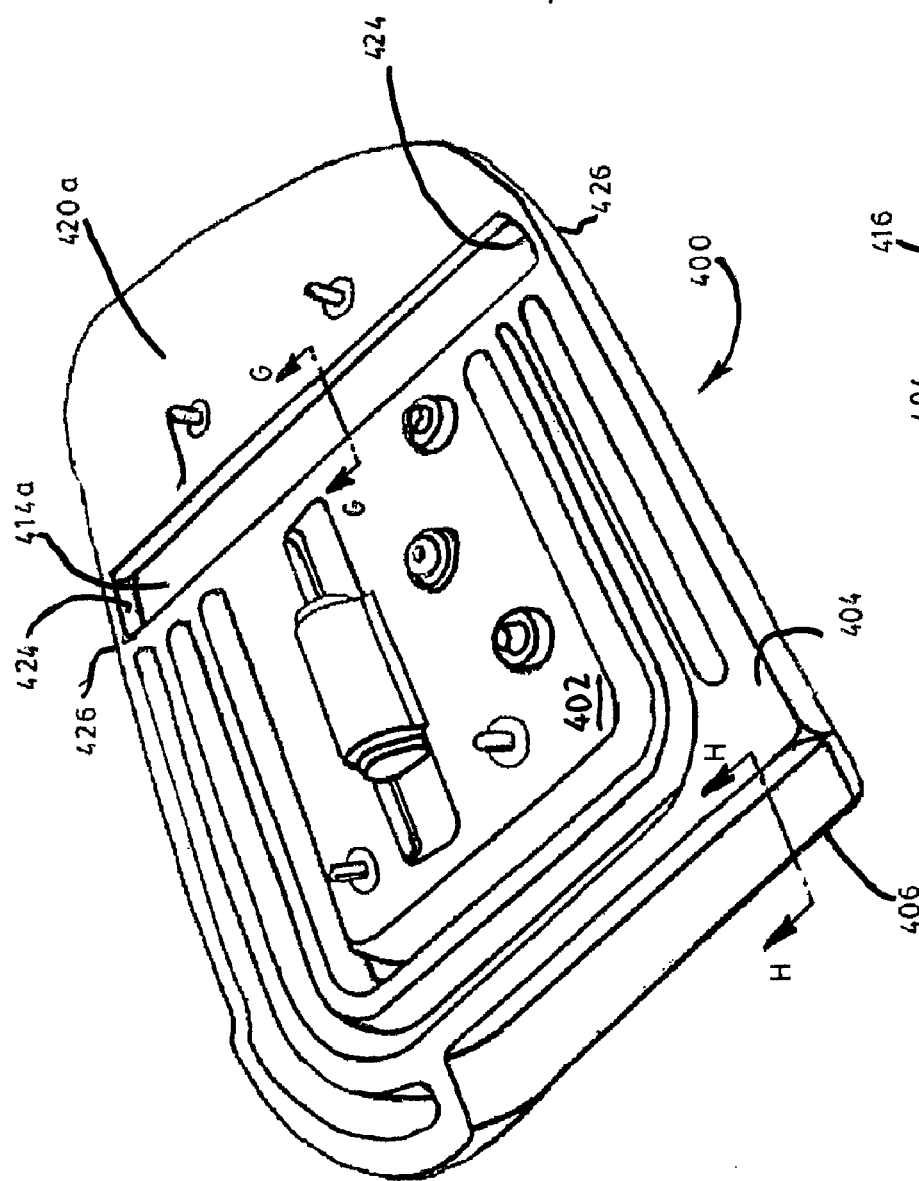
FIG. 19 illustrates a perspective view of a bolster in accordance with the invention which incorporates a fifth embodiment of the invention.
Figure 20:
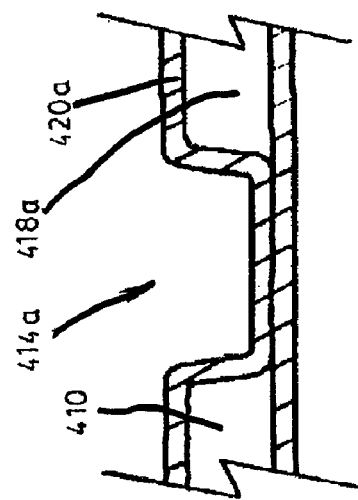
FIG. 20 is a sectional view taken along lines GG and HH shown in FIG. 19.

FIGS. 19 and 20 illustrate another embodiment of the invention which is similar to that of FIGS. 17 and 18. As before, a bolster 400 similarly comprises a housing 402 formed by a mounting wall 404 and an occupant wall 406, which surround a substantially closed volume 410 therebetween. The housing 402 is divided by restriction means 414a and 414b, which here comprise depressed areas 414a and 414b, into a main chamber 416 and two auxiliary portions 420a and 420b.

In the embodiments illustrated, and in contrast with the equivalent elements in FIGS. 17 and 18, the depressed area 414a extends the entire width of the housing 402, such that both ends 424 of the depressed area 414a engage the lateral side 426 of the housing 402. Therefore, there is no channel formed by the depressed area 414a between the main area 416 and the auxiliary chamber 418a formed by the auxiliary portion 420a. The auxiliary chamber 418a is isolated as there is little to no fluid communication between it and the main chamber 416. As such, auxiliary portion 420a will not inflate.

The auxiliary portion 420b is equivalent to the auxiliary portion 320b.

Figure 21:
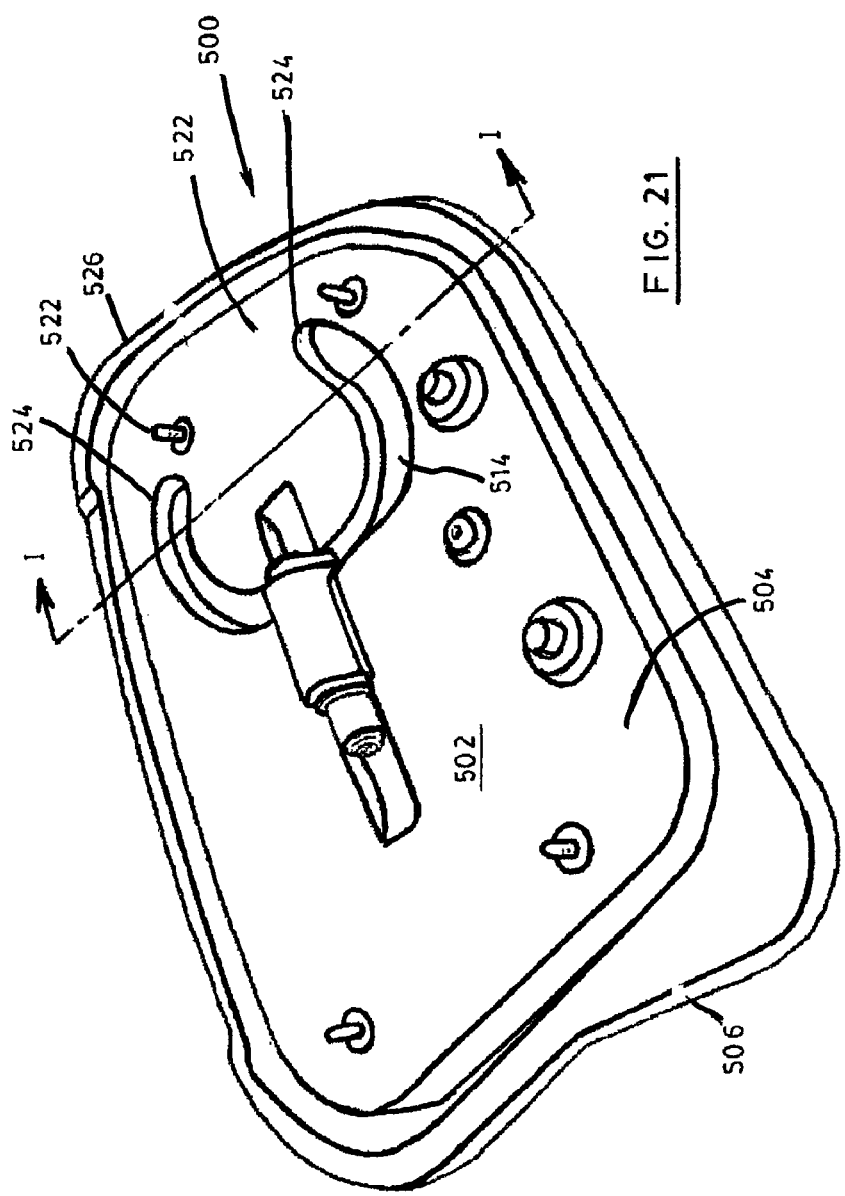
FIG. 21 illustrates a perspective view of a bolster in accordance with the invention which incorporates a sixth embodiment of the invention.
Figure 22:
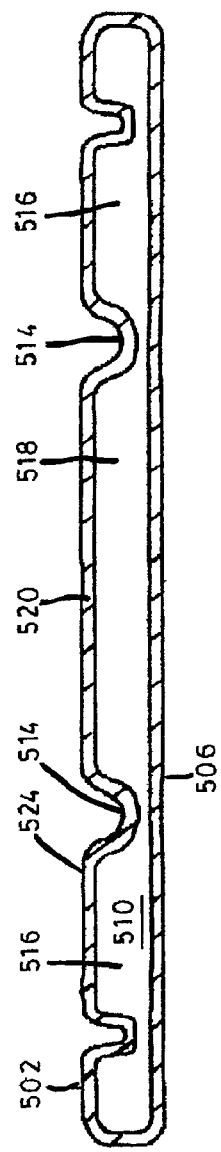
FIG. 22 is a sectional view taken along line II shown in FIG. 21.

FIGS. 21 and 22 illustrate another embodiment of the invention. As before, a bolster 500 similarly comprises a housing 502 formed by a mounting wall 504 and an occupant wall 506, which enclose a substantially closed volume 510 therebetween. The housing 510 is divided by a flow restriction 514, which here comprises a semi-circular depressed area 514, into a main chamber 516 and an auxiliary portion and chamber 520 and 518.

In this embodiment, the distance between the mounting wall 504 and the occupant wall 506 is locally decreased by the depressed area 514, that is to say the portions of the mounting wall 504 and the occupant wall 506 at the depressed area 514 are closer to each other than in the main chamber 516 and the auxiliary chamber 518. The walls 504 and 506 have not been completely compressed and are therefore not in contact. As such, it will be appreciated that the depressed area 514 only partially blocks fluid flow thereacross. However, such a decrease will nevertheless have an effect on the relative inflation rates of the main and auxiliary chambers 516 and 518.

A pair of channels 522 is formed between either end 524 of the semi-circular depressed area 514 and the lateral side 526 of the housing 502. The magnitude of the local decrease in the distance between the mounting wall 504 and the occupant wall 506 caused by the depressed area 514, in addition to the diameter and shape of the channels 522, will determine the relative inflation rates of the main and auxiliary chambers 516 and 518.

It will further be appreciated that an alternate channel could be provided which increases the local distance between the mounting wall 504 and the occupant wall 506 and may thereby increase flow to a given area.

In accordance with some of the embodiments illustrated and described herein, it will be recognized, that a bolster has been provided having an un-deployed length L measured in a direction referred to as the transverse direction. Upon deployment, utilizing either of the embodiments as described herein, the bolster may gain an additional length in that transverse direction by expansion of an extension structure to provide increased lateral length. The orientation of the bolster may be selected as desired by the vehicle designer and thus the directions, vertical and horizontal are given only by way of illustrative example and not by limitation. In fact, the bolster may be active or inactive and may be located in the vehicle as desired and in any orientation desired.

In accordance with some of the embodiments illustrated and described herein, it will further be recognized that a bolster has been provided having an auxiliary chamber with different deployment timing and or characteristics from that of a main chamber. In particular, as described herein, a restriction means and flow channel may be provided which restricts fluid flow to the auxiliary chamber, thereby delaying deployment. Alternatively, as described herein, a restriction means may be provided which blocks fluid flow to the auxiliary chamber entirely, thereby providing a portion which will not inflate when the bolster is deployed.

All descriptions and illustrations contained herein are to be taken by way of example only and reference shall be made to the claims for the full scope and extent of the invention.

The invention claimed is:

1. An inflatable bolster for use in an occupant compartment of a vehicle, the inflatable bolster comprising:
  a) an inflatable housing comprising:
    (i) a mounting wall which is devised to mount to a reaction structure of the vehicle;
    (ii) an occupant wall which is opposite the mounting wall and devised to face the occupant compartment;
    (iii) a substantially closed volume formed between the mounting wall and the occupant wall;
    (iv) a main chamber;
    (v) an auxiliary chamber;
    (vi) a flow restriction formed between the mounting wall and the occupant wall for restricting fluid flow between different areas of the housing, the main chamber and the auxiliary chamber being separated by the flow restriction; and
  b) a source of a pressurized fluid mounted to the housing and being in fluid communication with the substantially closed volume for inflating the housing, wherein
  c) the main chamber is in fluid communication with the source of the pressurized fluid, whereby during inflation the pressurized fluid flows first into the main chamber; and,
  d) the auxiliary chamber is in fluid communication with the main chamber whereby during inflation the pressurized fluid flows from the main chamber into the auxiliary chamber via the flow restriction at a flow rate reduced relative to fluid flowing within the main chamber during inflation of the main chamber to delay inflation of the auxiliary chamber relative to inflation of the main chamber, and
  e) wherein the flow restriction remains during inflation of the main chamber.

2. The inflatable bolster according to claim 1, wherein the flow restriction comprises a section of the housing where the mounting wall and the occupant wall are closer to each other than in the main chamber and the auxiliary chamber.

3. The inflatable bolster according to claim 1, wherein the flow restriction comprises at least one hollow rib and a flow channel.

4. The inflatable bolster according to claim 1, wherein the flow restriction defines a serpentine flow path.

5. The inflatable bolster according to claim 1, wherein the flow restriction comprises a hollow elongate flow passage of smaller cross-sectional area than the main chamber to constrict and reduce the fluid flow from the main chamber to the auxiliary chamber.

6. The inflatable bolster according to claim 1, wherein the flow restriction remains during inflation of the auxiliary chamber.

7. The inflatable bolster according to claim 1, wherein the flow restriction has a cross-sectional flow area, and wherein the cross-sectional flow area of the flow restriction remains substantially constant during inflation of the main chamber.

8. The inflatable bolster according to claim 1, wherein the flow restriction remains after inflation of the main chamber.

9. The inflatable bolster according to claim 1, wherein the flow restriction remains after inflation of the auxiliary chamber.

10. The inflatable bolster according to claim 1, wherein the flow restriction comprises a depressed area of the housing where the mounting wall and the occupant wall are in contact with each other and a flow channel connecting the auxiliary chamber to the main chamber.

11. The inflatable bolster according to claim 10, wherein the mounting wall and the occupant wall are sealed together over most of the width of the main chamber in the depressed area and remain sealed together during inflation of the auxiliary chamber such that the flow restriction remains during inflation of the auxiliary chamber.

* * * * *

UNITED STATES PATENT AND TRADEMARK OFFICE
CERTIFICATE OF CORRECTION

| | |
|---|---|
| PATENT NO. | : 7,980,589 B2 |
| APPLICATION NO. | : 12/422389 |
| DATED | : July 19, 2011 |
| INVENTOR(S) | : Michael James Best et al. |

It is certified that error appears in the above-identified patent and that said Letters Patent is hereby corrected as shown below:

Title Page
(73) Assignee: Please replace "Salflex Polymers Ltd., Winston, Ontraio (CA)" with --Salflex Polymers Ltd., Weston Ontario (CA)--.

Signed and Sealed this
Twentieth Day of September, 2011

David J. Kappos
*Director of the United States Patent and Trademark Office*